(12) United States Patent
Jacobson et al.

(10) Patent No.: US 10,190,349 B1
(45) Date of Patent: Jan. 29, 2019

(54) PET DOOR LOCKING HINGE DEVICE

(71) Applicants: Jason V. Jacobson, Brooklyn Center, MN (US); Brian A. Hohman, Chanhassen, MN (US); Norma J. Kiel, Bothell, WA (US)

(72) Inventors: Jason V. Jacobson, Brooklyn Center, MN (US); Brian A. Hohman, Chanhassen, MN (US); Norma J. Kiel, Bothell, WA (US)

( * ) Notice: Subject to any disclaimer, the term of this patent is extended or adjusted under 35 U.S.C. 154(b) by 0 days.

(21) Appl. No.: 15/919,733

(22) Filed: Mar. 13, 2018

(51) Int. Cl.
| | |
|---|---|
| *E05D 5/02* | (2006.01) |
| *E05D 11/10* | (2006.01) |
| *A01K 29/00* | (2006.01) |
| *E05F 3/20* | (2006.01) |
| *E05D 3/02* | (2006.01) |
| *E05D 7/00* | (2006.01) |
| *E06B 7/32* | (2006.01) |

(52) U.S. Cl.
CPC .......... *E05D 11/1014* (2013.01); *A01K 29/00* (2013.01); *E05D 3/022* (2013.01); *E05D 7/009* (2013.01); *E05F 3/20* (2013.01); *E06B 7/32* (2013.01)

(58) Field of Classification Search
CPC ....... A01K 29/00; E06B 7/32; E05D 11/1014; E05D 11/1028; E05D 11/1078; E05D 3/022; E05D 7/009; E05F 3/20; Y10T 16/551; Y10T 16/559; Y10T 16/540254; Y10T 16/540255; Y10T 16/540256; Y10T 16/540257; Y10T 16/5408; Y10T 16/54085; Y10T 16/5409; Y10T 16/54095
See application file for complete search history.

(56) References Cited

U.S. PATENT DOCUMENTS

| | | | | |
|---|---|---|---|---|
| 1,508,013 | A * | 9/1924 | De Waters | ............ E05D 3/022 16/351 |
| 1,612,462 | A * | 12/1926 | Mumford | ........... E05D 11/1078 16/351 |
| 1,933,115 | A * | 10/1933 | Jacobsen | ................. A45C 1/00 150/143 |
| 2,526,209 | A * | 10/1950 | Durup | ................ E05D 11/1014 16/336 |
| 2,571,430 | A * | 10/1951 | Durup | ................ E05D 11/1014 16/335 |
| 2,577,456 | A * | 12/1951 | Doman | ................... E05D 11/06 16/337 |
| 2,886,861 | A * | 5/1959 | Bartlett | ..................... E06B 7/32 49/402 |
| 3,104,415 | A * | 9/1963 | Stocker | ................... E05D 7/009 16/221 |
| 3,874,118 | A * | 4/1975 | Robinson | ................... E06B 7/32 119/484 |
| 4,063,330 | A * | 12/1977 | Triplette | ............ E05D 11/1014 16/321 |
| 4,206,532 | A * | 6/1980 | DeLorenzo | ............. B25H 1/06 16/377 |

(Continued)

Primary Examiner — Chuck Y Mah
(74) Attorney, Agent, or Firm — David Alan Lingbeck

(57) ABSTRACT

A pet door locking hinge device for providing a small lockable door sized just for a pet cut into a room door. The pet door locking hinge device includes a pet door having an end and being adapted to be hingedly coupled to a room door; and a hinge assembly fastened to the pet door and adapted to be fastened to the room door.

7 Claims, 3 Drawing Sheets

(56) References Cited

U.S. PATENT DOCUMENTS

| | | | | |
|---|---|---|---|---|
| 5,287,596 | A * | 2/1994 | Chen | E05D 11/06 16/331 |
| 5,423,149 | A * | 6/1995 | Herbst | E05D 7/02 16/249 |
| 5,581,940 | A * | 12/1996 | Peterson | A01K 13/003 119/652 |
| 5,778,491 | A * | 7/1998 | Baer | E05D 3/122 16/234 |
| 6,353,967 | B1 * | 3/2002 | Escobar | E06B 7/32 119/501 |
| 6,681,524 | B1 * | 1/2004 | Tillson | E06B 7/32 52/386 |
| 6,725,968 | B2 * | 4/2004 | Quam | E05D 7/009 181/287 |
| 7,966,697 | B2 * | 6/2011 | Springer | E05D 7/009 16/304 |
| 7,984,695 | B1 * | 7/2011 | Shaffer | E06B 7/32 119/501 |
| 8,826,594 | B2 * | 9/2014 | Graves | E05B 47/0012 49/169 |
| 2008/0047500 | A1 * | 2/2008 | Conway | A01K 13/003 119/652 |
| 2012/0167511 | A1 * | 7/2012 | Laudenklos | E06B 7/32 52/386 |

* cited by examiner

PET DOOR LOCKING HINGE DEVICE

BACKGROUND OF THE INVENTION

Field of the Invention

The present invention relates to door hinges and more particularly pertains to a new pet door locking hinge device for providing a small lockable door sized just for a pet cut into a room door.

Description of the Prior Art

The use of door hinges is known in the prior art. More specifically, door hinges heretofore devised and utilized are known to consist basically of familiar, expected and obvious structural configurations, notwithstanding the myriad of designs encompassed by the crowded prior art which have been developed for the fulfillment of countless objectives and requirements.

The prior art includes door hinges having first and second plates pivotably coupled to one another with one of the plates secured to the door and the other of the plates secured to the door jamb. While these devices fulfill their respective, particular objectives and requirements, the aforementioned patents do not disclose a new pet door locking hinge device.

SUMMARY OF THE INVENTION

The general purpose of the present invention, which will be described subsequently in greater detail, is to provide a new pet door locking hinge device which has many of the advantages of the door hinges mentioned heretofore and many novel features that result in a new pet door locking hinge device which is not anticipated, rendered obvious, suggested, or even implied by any of the prior art door hinges, either alone or in any combination thereof. The present invention includes a pet door having an end and being adapted to be hingedly coupled to a room door; and a hinge assembly fastened to the pet door and adapted to be fastened to the room door. None of the prior art includes the combination of the elements of the present invention.

There has thus been outlined, rather broadly, the more important features of the pet door locking hinge device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new pet door locking hinge device which has many of the advantages of the door hinges mentioned heretofore and many novel features that result in a new pet door locking hinge device which is not anticipated, rendered obvious, suggested, or even implied by any of the prior art door hinges, either alone or in any combination thereof.

Still another object of the present invention is to provide a new pet door locking hinge device for providing a small lockable door sized just for a pet cut into a room door.

Still yet another object of the present invention is to provide a new pet door locking hinge device that can be locked in an open position to allow passage of the pet through the pet door.

Even still another object of the present invention is to provide a new pet door locking hinge device that can be locked in a closed position so that the pet cannot pass through the pet door These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
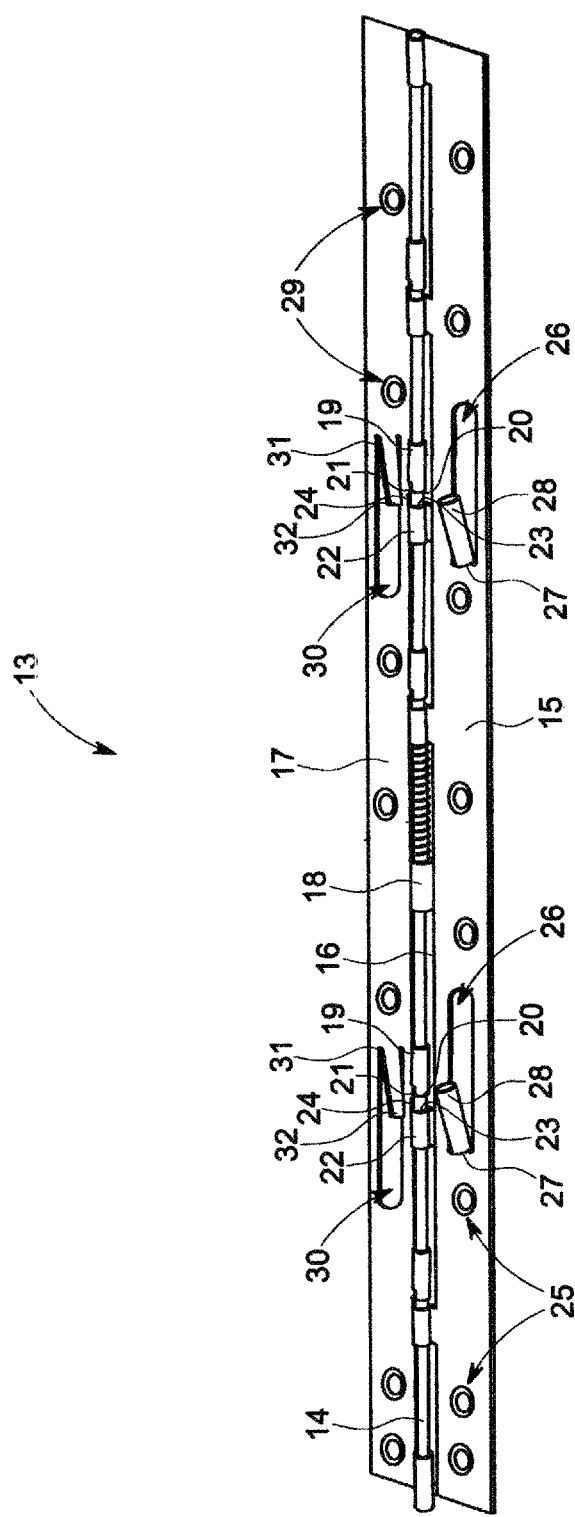
FIG. 1 is a perspective view of a new pet door locking hinge device according to the present invention in a locked open position.
Figure 2:
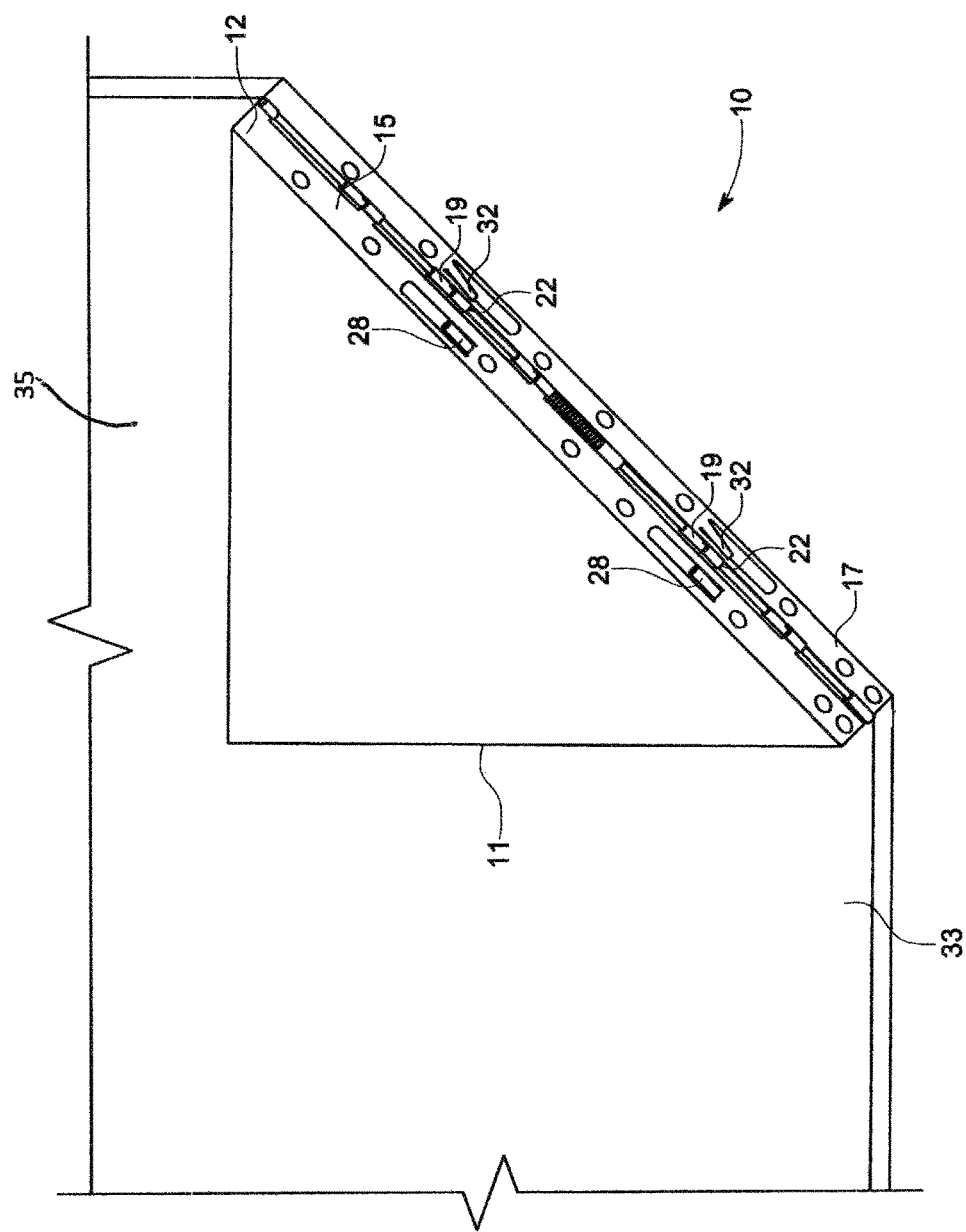
FIG. 2 is a perspective view of the present invention in a locked open position.
Figure 3:
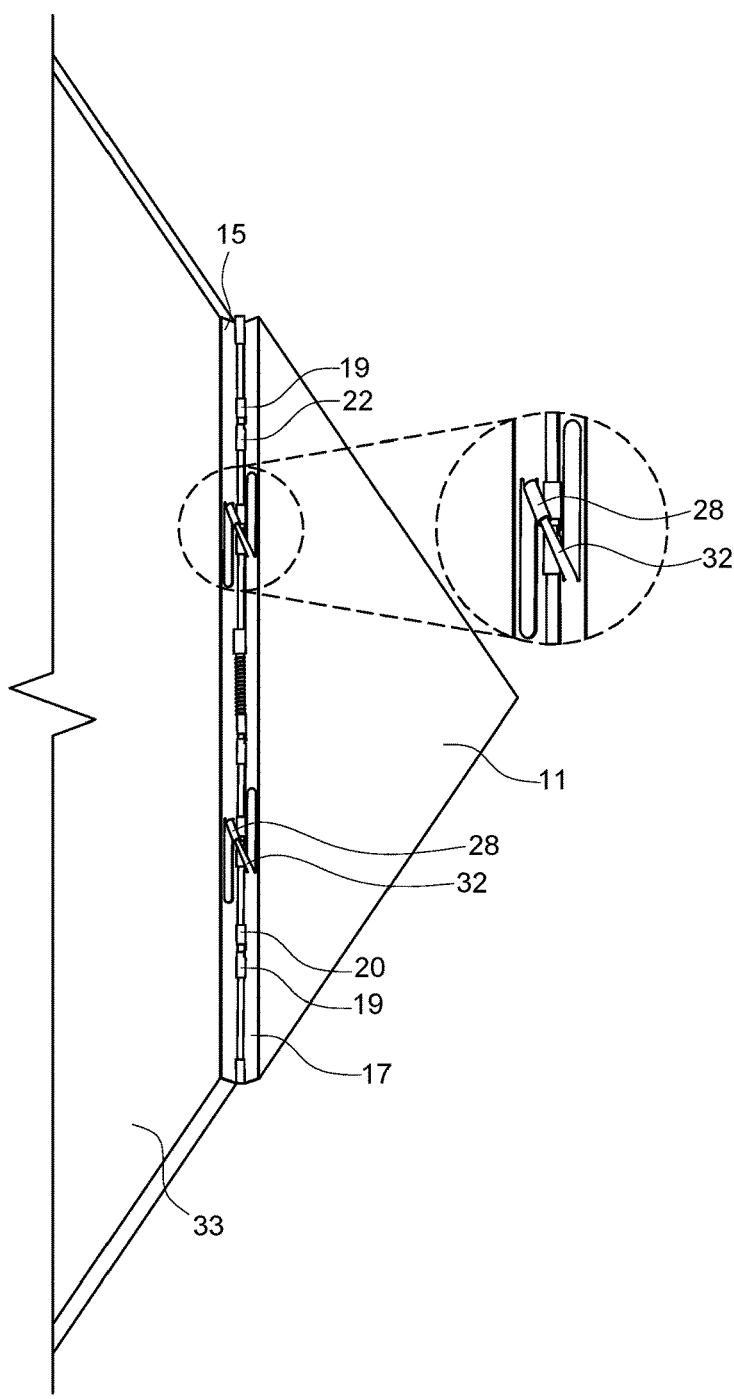
FIG. 3 is a perspective view of the hinged assembly of the present invention in a locked closed position.

With reference now to the drawings, and in particular to FIGS. 1 through 3 thereof, a new pet door locking hinge device embodying the principles and concepts of the present invention and generally designated by the reference numeral 10 will be described.

As best illustrated in FIGS. 1 through 3, the pet door locking hinge device 10 generally comprises a pet door 11 having an end 12 and being adapted to be hingedly coupled to a room door; and a hinge assembly 13 conventionally fastened with screws to the pet door 11 and adapted to be conventionally fastened with screws to the room door 33. The hinge assembly 13 includes a shaft 14, an elongated first plate 15 conventionally connected to the shaft 14, and an elongated second plate 17 pivotally and conventionally connected to the shaft 14. The hinge assembly 13 also includes hollow first tubular members 19 spaced apart and securely mounted and conventionally attached about the shaft 14 and securely and conventionally attached along a longitudinal edge 16 of the first plate 15. Each of the first tubular members 19 has an end 20 with a projecting portion 21 extending outwardly therefrom and along a longitudinal axis of a respective first tubular member 19. The projecting portion 21 of each said first tubular member 19 is laterally curved. The hinge assembly 13 also includes hollow second tubular members 22 spaced apart and rotatably mounted about and movable along the shaft 14 and securely and conventionally attached along a longitudinal edge 18 of the second plate 17. Each of the second tubular members 22 has an end 23 with a projecting portion 24 extending outwardly therefrom and along a longitudinal axis of the respective said second tubular member 22. The projecting portion 24 of each said second tubular member 22 is laterally curved. Each second tubular member 22 is movably engagable with a respective first tubular member 19 to lock the first and second plates 15, 17 in a side by side position relative to one another and in a plane with the pet door 11 being in a locked open position. Each projecting member 24 of a respective said second tubular member 22 is movably engagable with the projecting member 21 of a respective said first tubular member 19 to prevent the second plate 17 from rotating relative to the first plate 15. The first plate 15 has fastening holes 25 spaced along and disposed therethrough for fastening the first plate 15 to the room door 33 and also has openings 26 spaced apart and disposed therethrough. Each opening 26 has an end edge 27 with a female portion 28, such as a hollow tube, integrally attached thereto and extending inwardly of the opening 26. The second plate 17 has fastening holes 29 spaced along and disposed therethrough for fastening the second plate 17 to the pet door 11 and also has openings 30 spaced apart and disposed therethrough. Each opening 30 in the second plate 17 has an end edge 31 with a male portion 32, such as a dowel, integrally attached thereto and extending inwardly of the opening 30. Each of the male portions 32 of the second plate 17 is removably engaged with a respective female portion 28 of the first plate 15 with the second plate 17 rotated upon the first plate 15 to lock the pet door 11 closed. To open the pet door 11, each of the male portions 32 of the second plate 17 is disengaged from a respective female portion 28 of the first plate 15 which allows the second plate 17 to rotate relative to the first plate 15.

In use, the pet door 11 is locked in an, open position against a side 35 of the room door 33 to allow a pet to pass through. The second tubular members 22 are moved into engagement with the first tubular members 19 with the second plate 17 positioned side by side and in a plane with the first plate 15. The pet door 11 is locked in a closed position in a plane with the room door 33 to prevent the pet to pass through. The second plate 17 is rotated onto the first plate 15 and the male members 32 are moved into engagement with the female members 28 with the pet door 11 being in a plane with the room door 33.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the pet door locking hinge device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A pet door locking hinge device comprising:
a pet door having an end and being adapted to be hingedly coupled to a room door; and
a hinge assembly fastened to the pet door and adapted to be fastened to the room door, wherein the hinge assembly includes a shaft, an elongated first plate connected to the shaft, and an elongated second plate pivotally connected to the shaft, wherein the first plate has fastening holes spaced along and disposed therethrough for fastening to the room door and also has openings spaced apart and disposed therethrough, wherein each said opening has an end edge with a female portion attached thereto and extending inwardly of the opening.

2. The pet door locking hinge device as described in claim 1, wherein the second plate has fastening holes spaced along and disposed therethrough for fastening the second plate to the pet door and also has openings spaced apart and disposed therethrough, wherein each said opening in the second plate has an end edge with a male portion attached thereto and extending inwardly of the opening.

3. The pet door locking hinge device as described in claim 2, wherein each of the male portions of the second plate is removably engaged with a respective said female portion of the first plate with the second plate rotated upon the first plate to lock the pet door closed.

4. The pet door locking hinge device as described in claim 3, wherein to open the pet door, each of the male portions of the second plate is disengaged from a respective said female portion of the first plate which allows the second plate to rotate relative to the first plate.

5. A method of using a pet door locking hinge device comprising the steps of:
providing a pet door, a first plate fastened to a room door and having female members, first tubular members with projecting portions, a second plate fastened to the pet door and having male members, and second tubular members with projecting portions;
locking the pet door in an open position against a side of the room door to allow a pet to pass through; and
locking the pet door in a closed position in a plane with the room door to prevent the pet to pass through.

6. The method of using the pet door locking hinge device as described in claim 5 wherein the locking the pet door in an open position includes moving the projecting portions of the second tubular members into engagement with the projecting portions of the first tubular members with the second plate positioned side by side and in a plane with the first plate.

7. The method of using the pet door locking hinge device as described in claim 5 wherein locking the pet door in a closed position includes rotating the second plate onto the first plate and moving the male members into engagement with the female members with the pet door being in a plane with the room door.

* * * * *